(12) United States Patent
Rolando Avila Cusicanqui

(10) Patent No.: US 7,615,905 B2
(45) Date of Patent: Nov. 10, 2009

(54) HYBRID ELECTRIC RELUCTANCE MOTOR

(76) Inventor: Oscar Rolando Avila Cusicanqui, Calle Los Ceibos, sem numro, Tucsupaya Baja, Sucre (BO)

( * ) Notice: Subject to any disclaimer, the term of this patent is extended or adjusted under 35 U.S.C. 154(b) by 0 days.

(21) Appl. No.: 11/596,009

(22) PCT Filed: Oct. 25, 2004

(86) PCT No.: PCT/BR2004/000208

§ 371 (c)(1), (2), (4) Date: Jul. 6, 2007

(87) PCT Pub. No.: WO2005/107356

PCT Pub. Date: Nov. 17, 2005

(65) Prior Publication Data

US 2008/0030092 A1 Feb. 7, 2008

(30) Foreign Application Priority Data

May 12, 2004 (BR) .................................. 0402045

(51) Int. Cl.
*H02K 1/00* (2006.01)
(52) U.S. Cl. ....................................... 310/181; 310/166
(58) Field of Classification Search ................. 310/181, 310/166, 168, 112, 162, 154.02
See application file for complete search history.

(56) References Cited

U.S. PATENT DOCUMENTS

| 4,479,103 | A | | 10/1984 | Bailey et al. |
| 4,713,570 | A | * | 12/1987 | Mastromattei ............... 310/181 |
| 4,763,034 | A | * | 8/1988 | Gamble ....................... 310/181 |
| 6,232,693 | B1 | * | 5/2001 | Gierer et al. ................. 310/214 |
| 6,777,842 | B2 | * | 8/2004 | Horst ..................... 310/154.11 |

FOREIGN PATENT DOCUMENTS

| EP | 0018352 | | 10/1980 |
| EP | 932 167 | A2 | 7/1999 |
| EP | 1 058 372 | A2 | 12/2000 |

* cited by examiner

*Primary Examiner*—Michael C Zarroli
(74) *Attorney, Agent, or Firm*—Bacon & Thomas, PLLC

(57) ABSTRACT

Hybrid electric reluctance motor, characterized by the fact of its having an arrangement with coils (8) in opposition and permanent magnets (9) in opposition and in parallel with the coils (8) in the stator and/or rotor (2); when the coils (8) of the motor's stators and/or rotors (2) are energized, the magnetic fluxes or fields of the magnets (9) combine with the magnetic fluxes or fields of the coils (8) in the air gap, thus producing a greater torque due to the magnetic flux or field contribution of the magnets (9); the motor's stators and/or rotors (2) are de-energized, the magnetic fluxes or fields of the magnets (9) enter the toroid in relation and in proportion to the same flux reduction in the coils (8) in function of time as a result of the current reduction in function of time.

7 Claims, 13 Drawing Sheets

I=1A/div
B=2 kg/div

I=1A/div
B=2 kg/div

HYBRID ELECTRIC RELUCTANCE MOTOR

FIELD OF THE INVENTION

The present report discusses an Invention Patent that describes a hybrid electric motor of the type that can be used in the most varied fields of human activity. In a more general manner, this patent also discusses an electric machine with coils in opposition and permanent magnets in opposition and in parallel with the coils in the stator or rotor.

BACKGROUND OF THE INVENTION

Electric machines in current prior art are related to the process known as "electromechanical energy conversion", therefore, an electric machine and the link between an electric system and a mechanical system.

Conversion is reversible in these machines, i.e., if the conversion is from mechanical to electrical the machine is called a generator, on the other hand, if the conversion is from electrical to mechanical the machine is called a motor, reason why this type of machine can be operated as a generator or motor, being called AC machines if the system is Alternating Current, and DC machines if Direct Current (generators or motors).

Within both categories mentioned, there are a variety of motors and generators, including those that use permanent magnets to produce magnetic fluxes.

Permanent magnets are used in the stator and coils in the rotor, or magnets in the rotor and coils in the stator in an electric machine (motor or generator), this being to economize space, since a permanent magnet occupies less space than an electromagnet having an iron core and copper wire coil.

Magnets are usually employed in motors or generators, segmented for reasons of said space economy. Permanent magnets are also used to raise the efficiency of motors, since the permanent magnets have no coil, copper loss ($I^2R$) is reduced.

Generally, a problem found in these motors that count on permanent magnets is that the magnetic field flux created by the magnet is static and permanent, in addition to the fact that this flux cannot be controlled from a minimum value to a maximum value or vice-versa, as is the case with electromagnets that produce fully controllable fluxes because they respond to the current and the number of coil windings.

In conventional motors that use permanent magnets, the lower current corresponds to a lower magnetic flux and a higher current corresponds to a higher magnetic flux.

Therefore, and for instance, it is impossible to create a series motor when the stator is made of permanent magnets and the rotor of is made of coil; the same goes for the inverse case.

In many types of series motors (rotor coils in series with stator coils), of variable speed that operate with electromagnets only, the amperage is reduced on lowering the voltage, for this reason, the motor speed is proportionally reduced, including, proportionally, the back emf. Inversely, on raising the voltage, the amperage is increased and therefore the speed, including the back emf, is proportionally increased.

In motors with permanent magnets, located in the stator or rotor coils, or vice-versa, the back emf is proportional to the permanent magnet flux and is not controllable.

In view of this problem, it is not recommended that permanent magnets be placed in variable speed motors, since when the current is cut from the motor, the rotor, by inertia, continues to turn due to the magnet's fixed field present, producing back emf, which in most cases is prejudicial.

SUMMARY OF INVENTION

A Hybrid electric reluctance motor has an arrangement with coils in opposition and permanent magnets in opposition and parallel with the coils in a stator and/or rotor. When the coils of the motor's stators and/or rotors are energized, the magnetic fluxes or fields of the magnets combine with the magnetic fluxes or fields of the coils in the air gap, thus producing an increased torque due to the magnetic flux or field contribution of the magnets.

BRIEF DESCRIPTION OF THE DRAWINGS

In view of the inconveniences above, the object of this Invention Patent, which discusses a hybrid electric reluctance motor, whose merit will become more evident with the illustrations listed below, in which:

FIG. 7 shows a third reproduction obtained based on the Finite Element Program, which represents the stator excited with 5000 AT;

DETAILED DESCRIPTION

Figure 1:
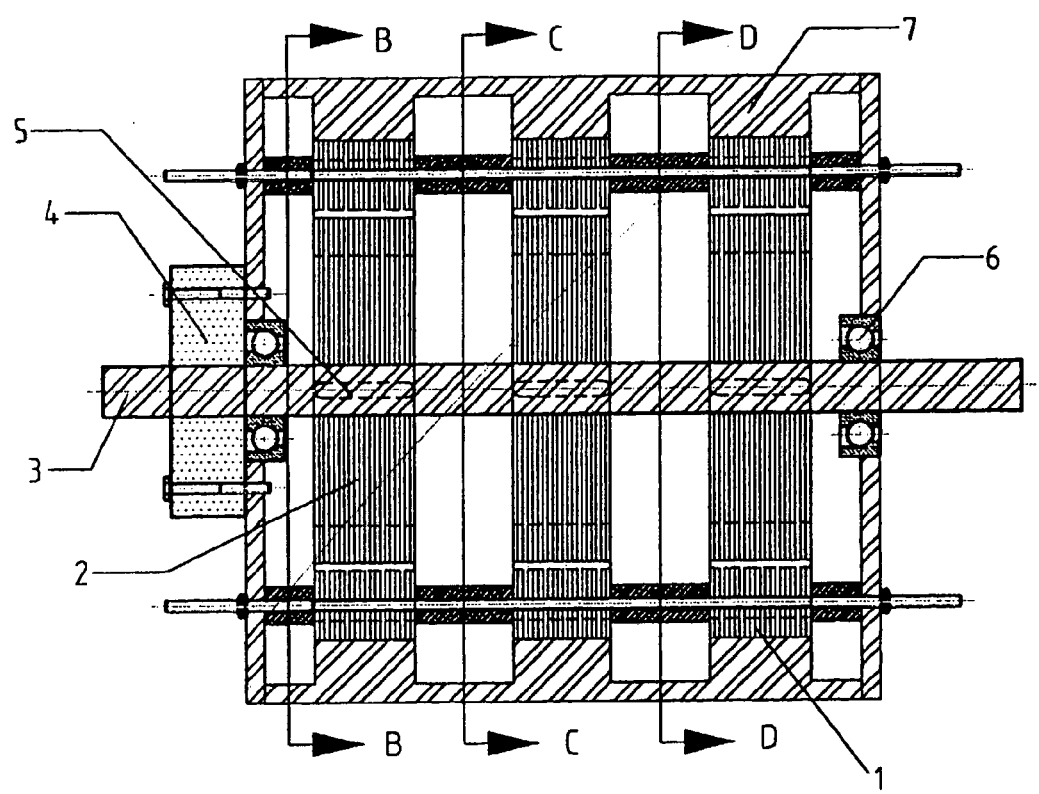
FIG. 1 shows a schematic section of a hybrid electric motor like the one proposed in this Invention Patent, this view corresponding to section A-A indicated in FIG. 2.

As shown by the figures listed above, the hybrid electric motor discussed herein is formed by one or more steel plate stators 1, with coils 8 and with their respective steel plate rotors 2, the latter being mounted on a single shaft 3 and aligned, each with its respective stator 1, as shown in FIG. 1—section A-A.

The stators 1 and rotors 2 have the same number of salient poles in an even number, as can be seen from FIGS. 1, 2, 3 and 4, representing sections A-A, B-B, C-C and D-D.

Figure 2:
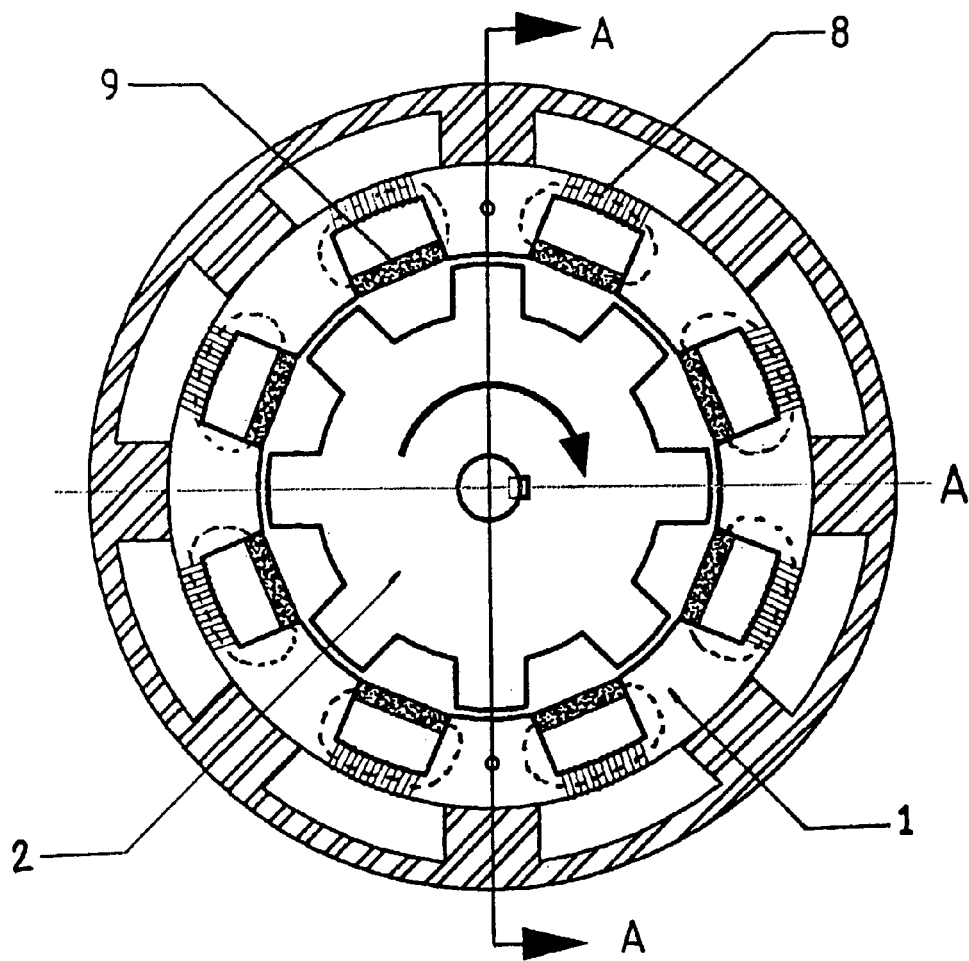
FIG. 2 shows a schematic section of the hybrid electric motor proposed by this Invention Patent, this view corresponding to section B-B indicated in FIG. 1 and where arrow A indicates the magnetic flux of the magnet in toroid.
Figure 3:
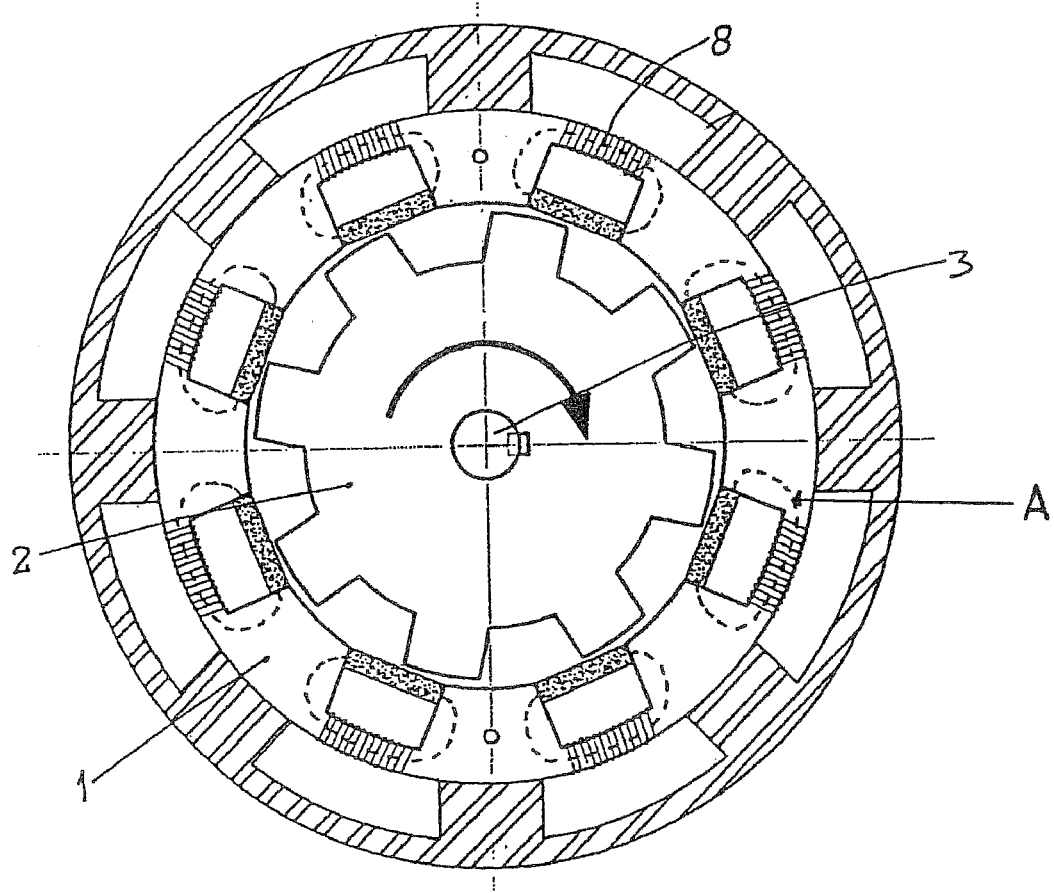
FIG. 3 shows a section C-C taken from FIG. 1, where the arrow A indicates the flux of the magnet in toroid.
Figure 4:
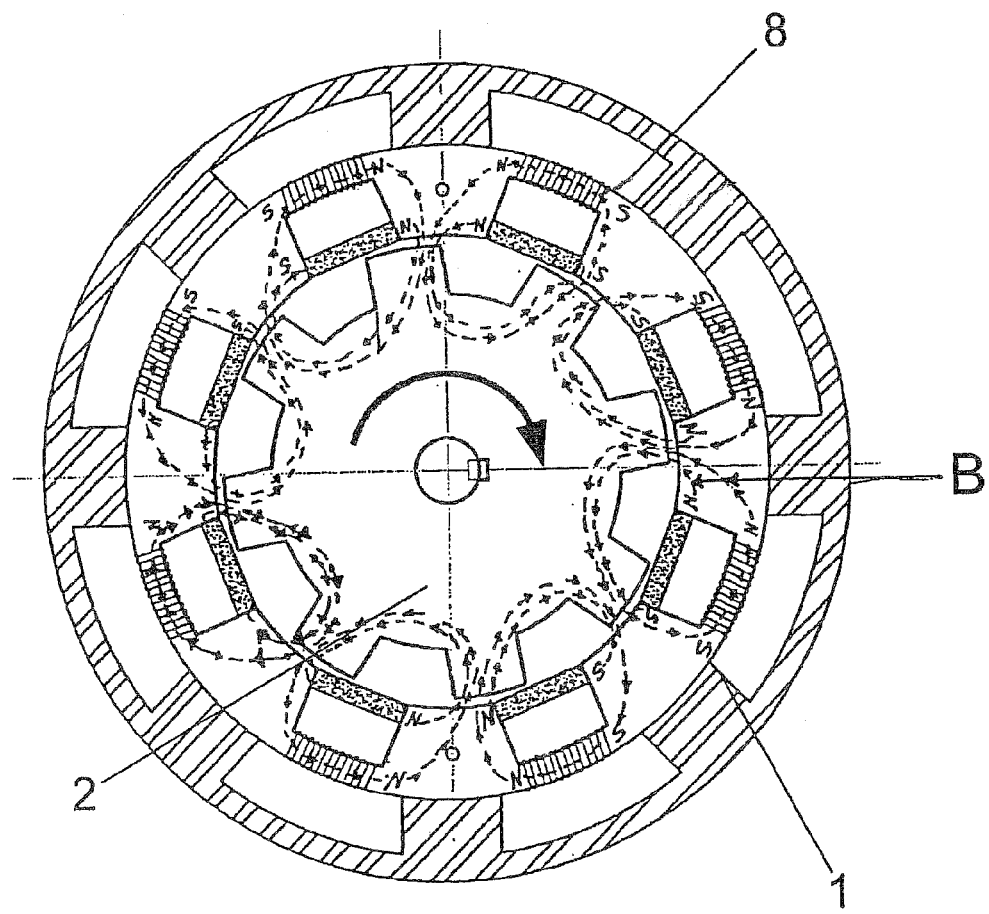
FIG. 4 shows a section D-D also taken from FIG. 1, where the arrow B indicates the magnet's flux and the coil's flux in the air gap producing the torque.

The coils 8 in this new type of motor, and as can be seen in FIGS. 2, 3 and 4, are positioned in the outer perimeter or crown of stator 1, with the windings in "opposition", as can be seen in FIG. 4, which shows section D-D, where the arrows show the direction of the coil fluxes.

The permanent magnets 9 are located between each pole, as can be seen in FIG. 2, which shows section B-B, and in parallel with the coils 8, as can be seen in FIG. 2, which shows the section B-B and also in the case of coils in "opposition", as can be seen in FIG. 4, which shows section D-D (direction of the magnets' flux).

When all the coils 8 of the stator are energized at a time and, since their windings are in "opposition", the fluxes created by them due to the passing of current are also in "opposition", as can be seen in FIG. 4, which shows section D-D.

Figure 5:
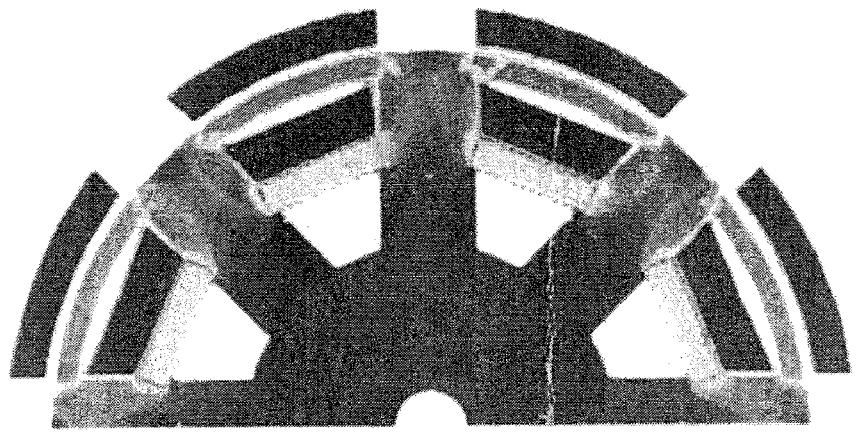
FIG. 5 shows a first reproduction obtained based on a Finite Element Program.
Figure 5:
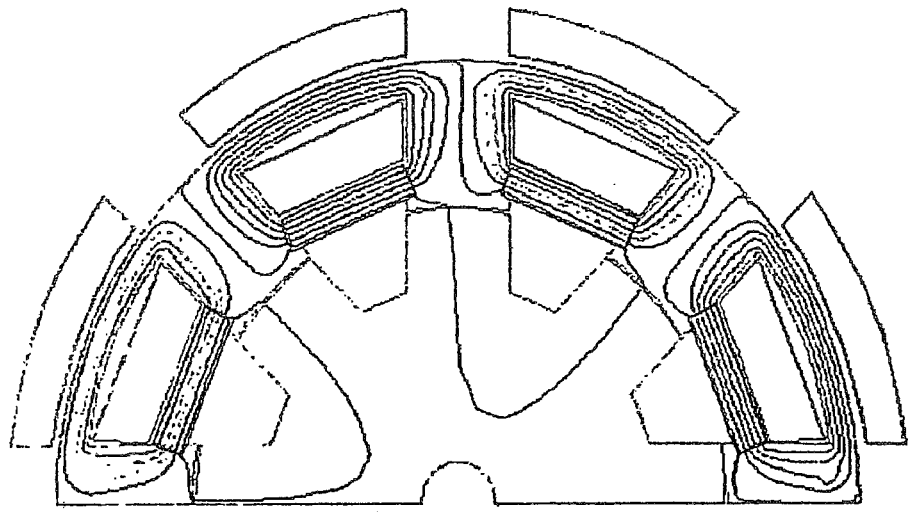

These fluxes produced by coils 8 pass through the path of the poles' legs and in direction of the "air gap"; in this path, these magnetic fluxes meet the magnetic fluxes created by the permanent magnets 9 that are in toroid direction, as shown in FIG. 4, which shows section D-D and in FIG. 5, which is a representation made by a Finite Element computer program.

Since the fluxes of the permanent magnets 9 are opposing the fluxes of the coils 8, this due to their having the same polarity as the coil fluxes, they are repelled by them, causing them to leave the toroid in direction of the "air gap", obtaining as a result, in the "air gap", the sum of magnetic fluxes of the coils and magnets, which close their circuits through the rotor poles up to the stator poles, as shown in FIG. 4, which represents section D-D.

Thus, the magnetic fluxes are obtained with the same current required to produce the coil fluxes alone.

Figure 6:
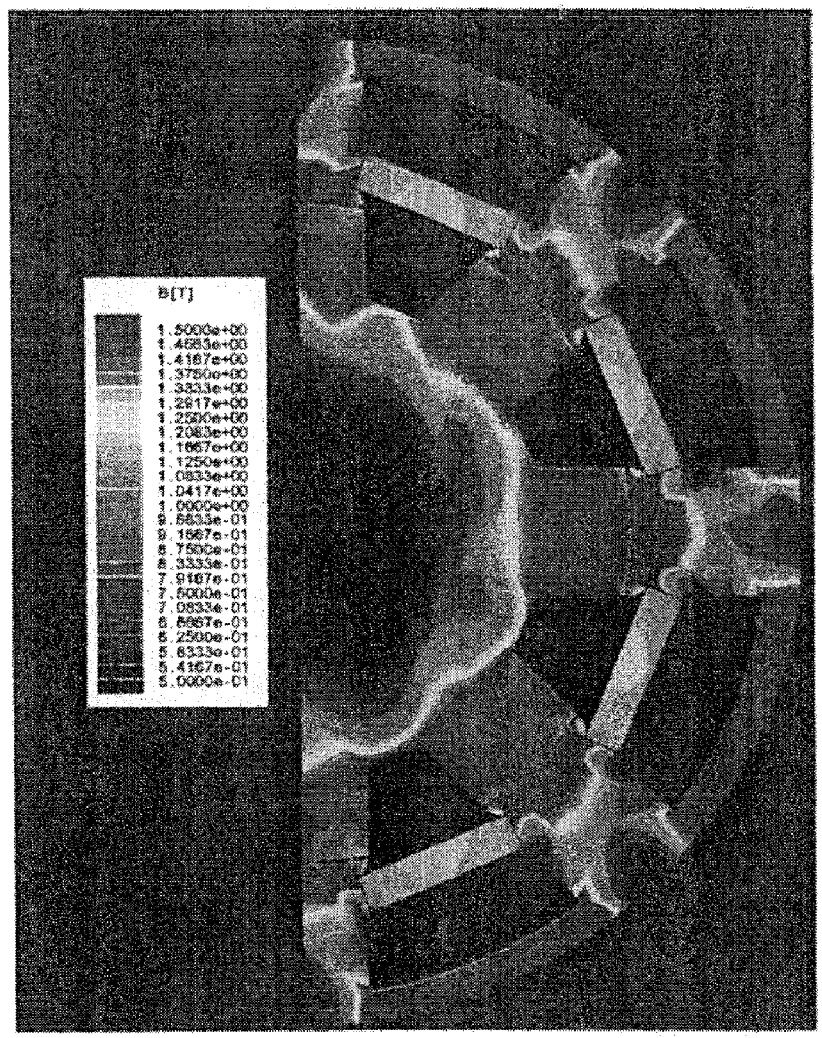
FIG. 6 shows a second reproduction obtained based on the same Finite Element Program, which shows the motor excited with 2800 AT (Ampere-turn) at 0 degrees.
Figure 7:
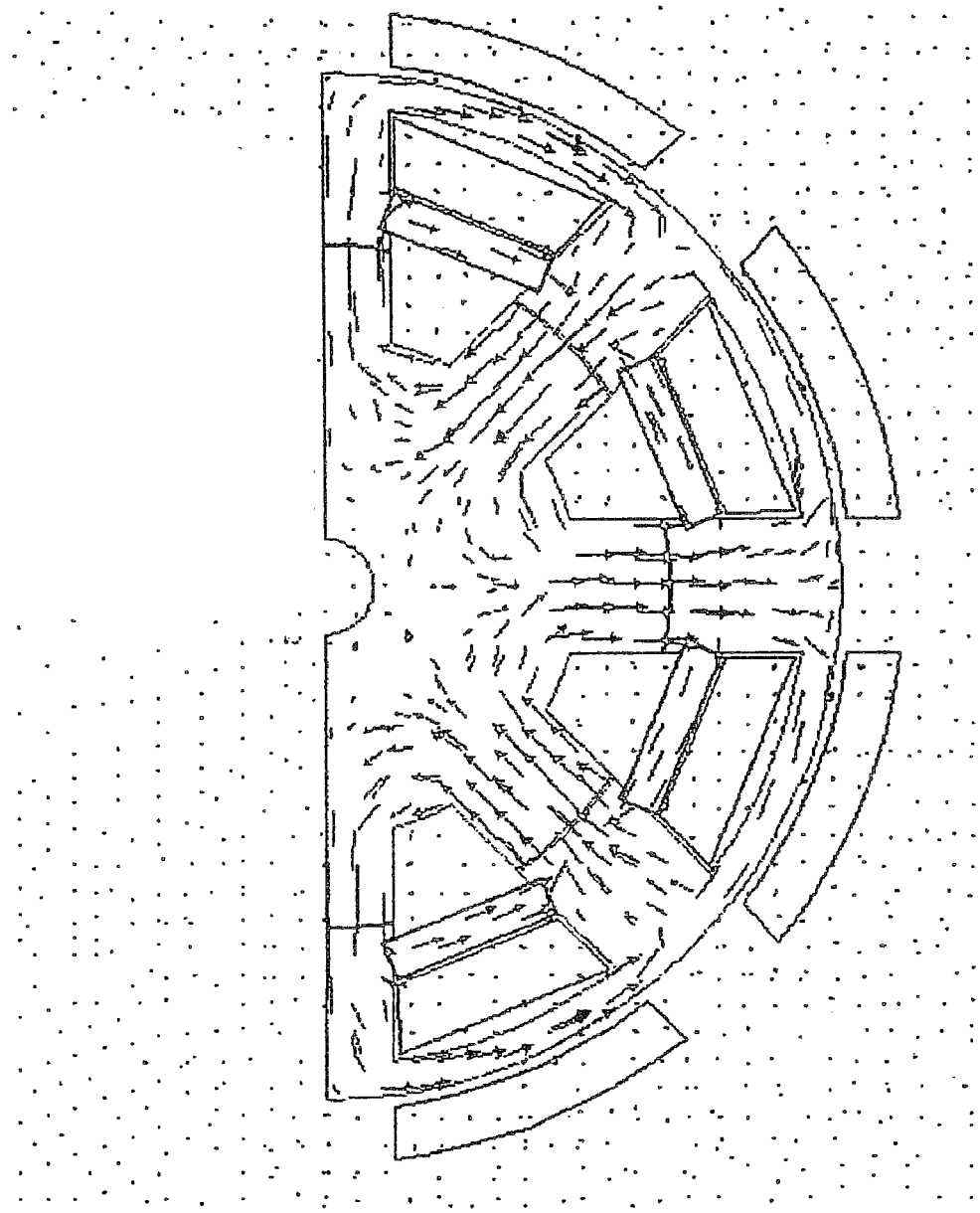

This magnetic contribution from the permanent magnets 9 increases the torque of the motor discussed herein. FIGS. 6 and 7, produced by the Finite Element Program, show a state when the rotor 2 poles are facing the stator 1 poles.

Still regarding FIG. 1, we can also see other basic components of the motor in question, which are: the encoder, indicated in this figure by reference number 4, one of the keys 5, the bearing 6, and the case or body of the motor 7.

Figure 8:
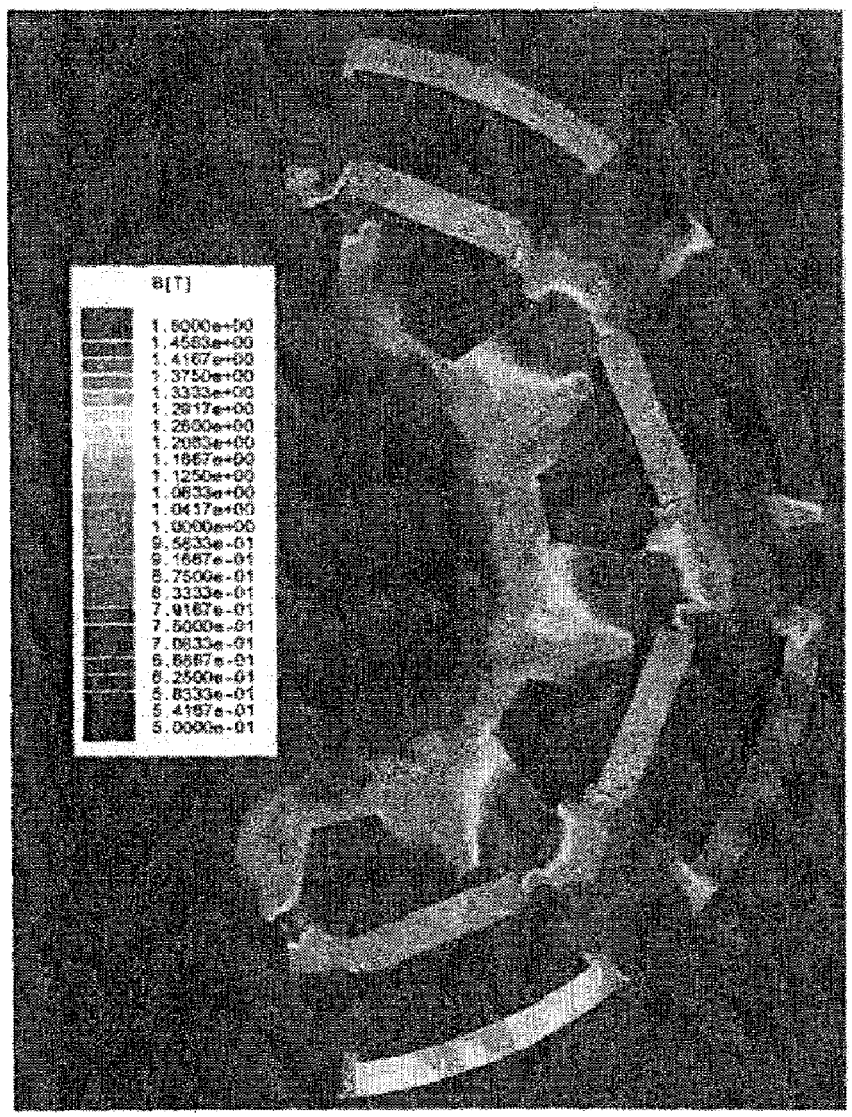
FIG. 8 shows a fourth reproduction obtained based on the Finite Element Program, which shows the motor excited with 2800 AT at 10 degrees.

FIG. 8, also produced with the same Finite Element Program, shows the flux of the magnets and electromagnets when the rotor 2 poles are entering to become aligned with the stator 1 poles. It can be clearly seen in the same FIGS. 6 and 7 that the magnetic density in the pole is the same as that found in the crown or core of the coil 8, differing in that the pole section is double the sum of the sections of the cores of the coils that deliver their fluxes to this pole.

Figure 10:
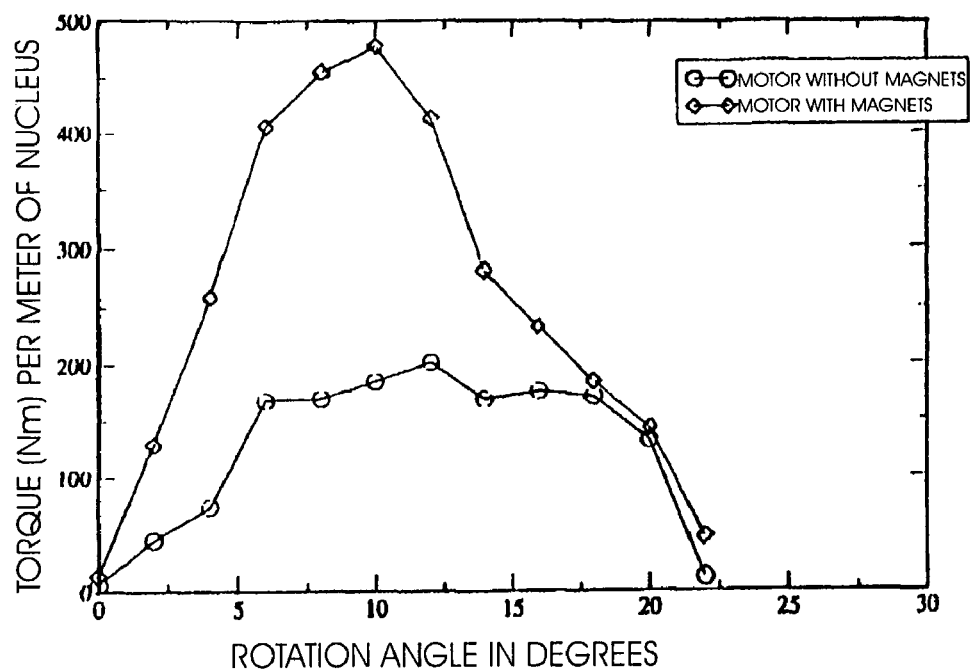
FIG. 10 shows a graph comparing the torque and rotation of an electric motor with and without magnets.

This same magnetic density in the pole, although double in section, is due to the contribution of the flux of the magnets 9 that are in parallel with the coils 8, thus delivering their fluxes to the pole and air gap. This occurs with the same ampere turns that need only the coils, as can be seen in the graph of FIG. 10 (with and without magnets), produced by the Finite Element Program, where the increase in torque in function of the magnetic flux of the magnets 9 when they are in the abovementioned states can clearly be seen.

Figure 9:
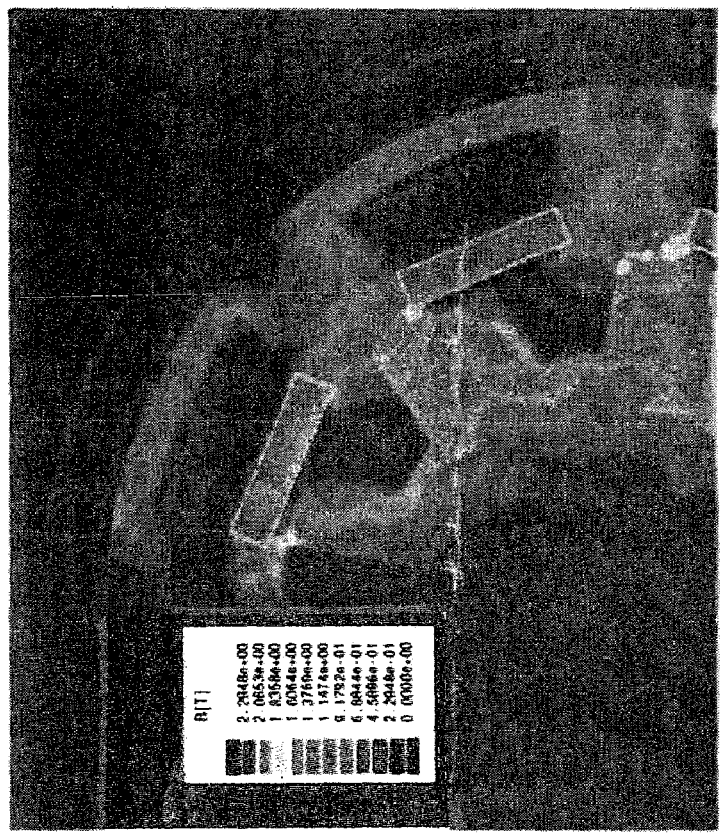
FIG. 9 shows the fifth reproduction based on the Finite Element Program, where (a) shows the flux lines and (b) the flux densities.
Figure 9:
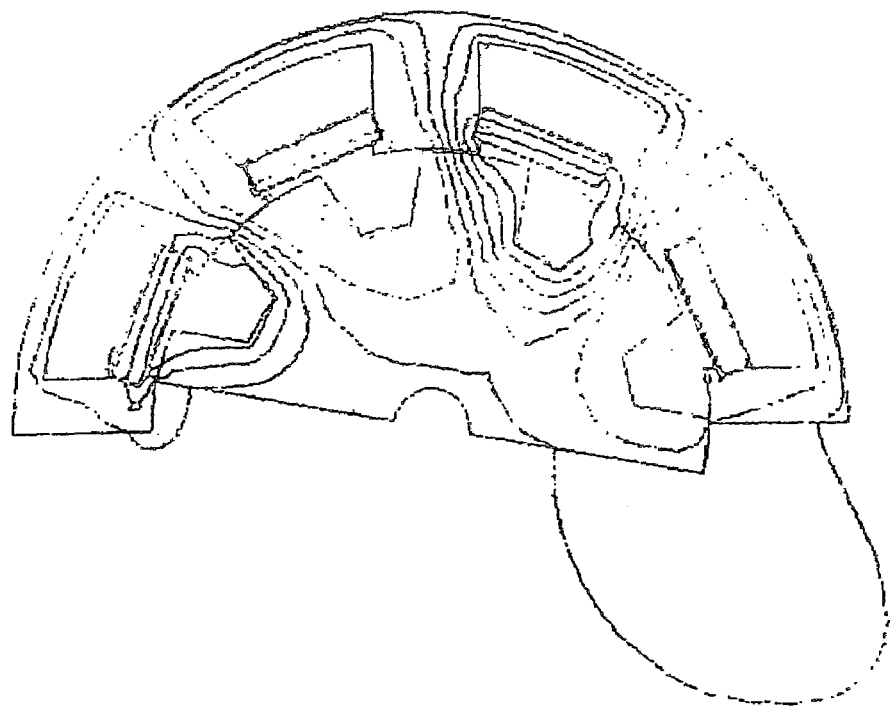

When the electric current in the coils 8 of stator 1 is cut, the magnetic fluxes created by them practically drop to zero in their poles. The magnetic fluxes of the magnets 9 in this state enter the toroid in proportion to the reduction in the coils 8 and finally reduction of the fluxes of the coils 8 in function of time, as can be seen in FIG. 2, which represents section B-B, as well as in FIG. 9 produced by the Finite Element Computer Program.

Based on the above explanations, the magnetic fields of the magnets 9 are being commuted from the toroid to the pole and from the pole to the toroid, only as a result of the control of magnetic flux of the coils 8. Thus, the magnetic field or flux of the magnets 9 is being controlled according to the increase or reduction of the coil 8 current in function of time, as can be seen in the graphs in FIGS. 11 and 12 of the oscilloscope, only coil—FIG. 11, and coil with magnet—FIG. 12, produced with half-wave current at 120 c/s.

In said graphs and with the cycling marked, one clearly sees the increase in magnetic flux or field when the magnet 9 is added to the system; this magnetic flux is from the magnet 9 when it is in the abovementioned states and states in this invention.

Figure 11:
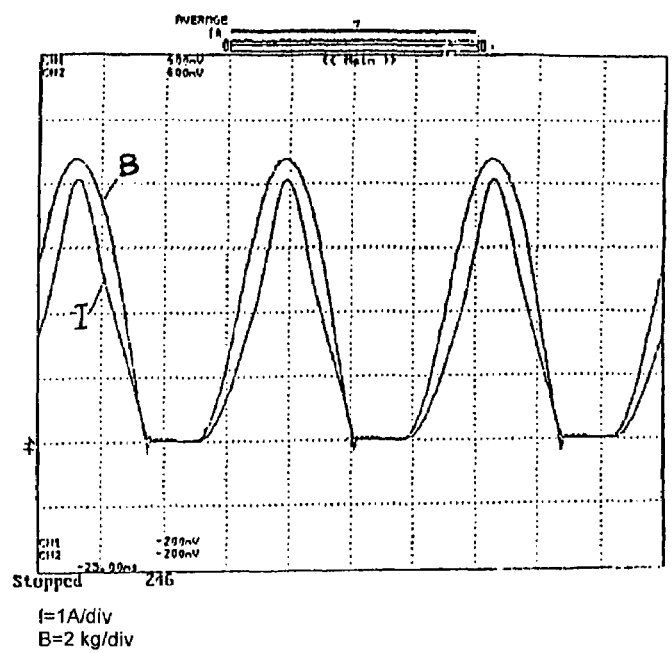
FIG. 11 shows another representative graph of an oscilloscope in a state without magnet.
Figure 12:
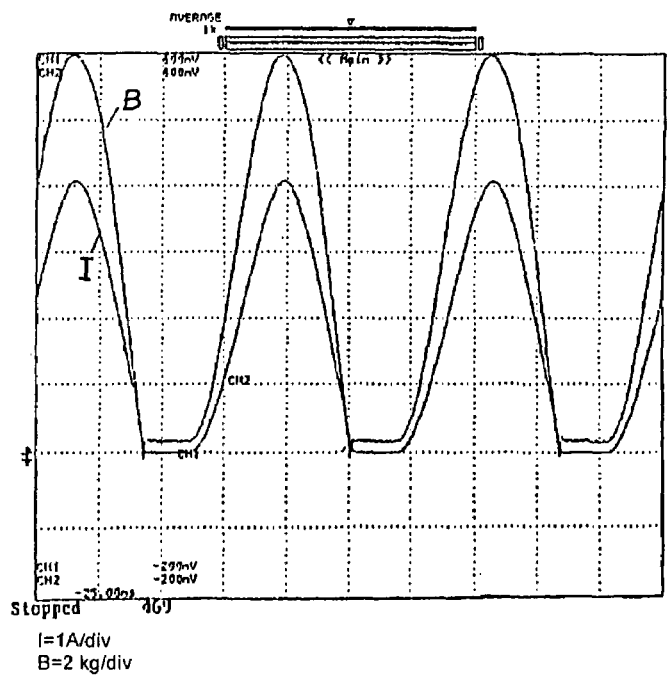
FIG. 12 shows a graph similar to that in FIG. 11, however in a state with magnet.

It is therefore important to repeat that due to the commutation of the coils 8 as shown in the graphs in FIGS. 11 and 12 of the oscilloscope, the magnetic flux of the magnets 9 are also being commuted from the air gap to the toroid and from the toroid to the air gap, with the advantage that when the coil 8 current is activated, producing a flux proportional to the current and in function of time, the flux of the magnet 9 leaves the toroid in the same proportion as the flux in the coil 8 and at the same time.

As a result, as previously explained in this report, the flux of the magnet 9 is combined with the flux of the coil 8, both fluxes being conducted together to the air gap. When the current from the coils 8 is deactivated, the magnetic field or flux of the coils 8 reduce until it reaches zero in function of time, and even thus, the magnetic flux or field of the magnets 9 enter the toroid at the same time, reducing its flux in the air gap until it reaches zero, in proportion to the flux reduction in the coil at the same time.

It is important to point out that the same configuration of the permanent magnets 9 in parallel with the coils 8 can be used in the stator 1, in the rotor 2, or in the stator and rotor of an electric machine (motor or generator). Therefore, and due to commutation of the flux of the magnet 9 in the abovementioned states, permanent magnets 9 can be placed in the rotor 2 as well as in the stator 1, something that had not been done until this invention's proposal.

Figure 13:
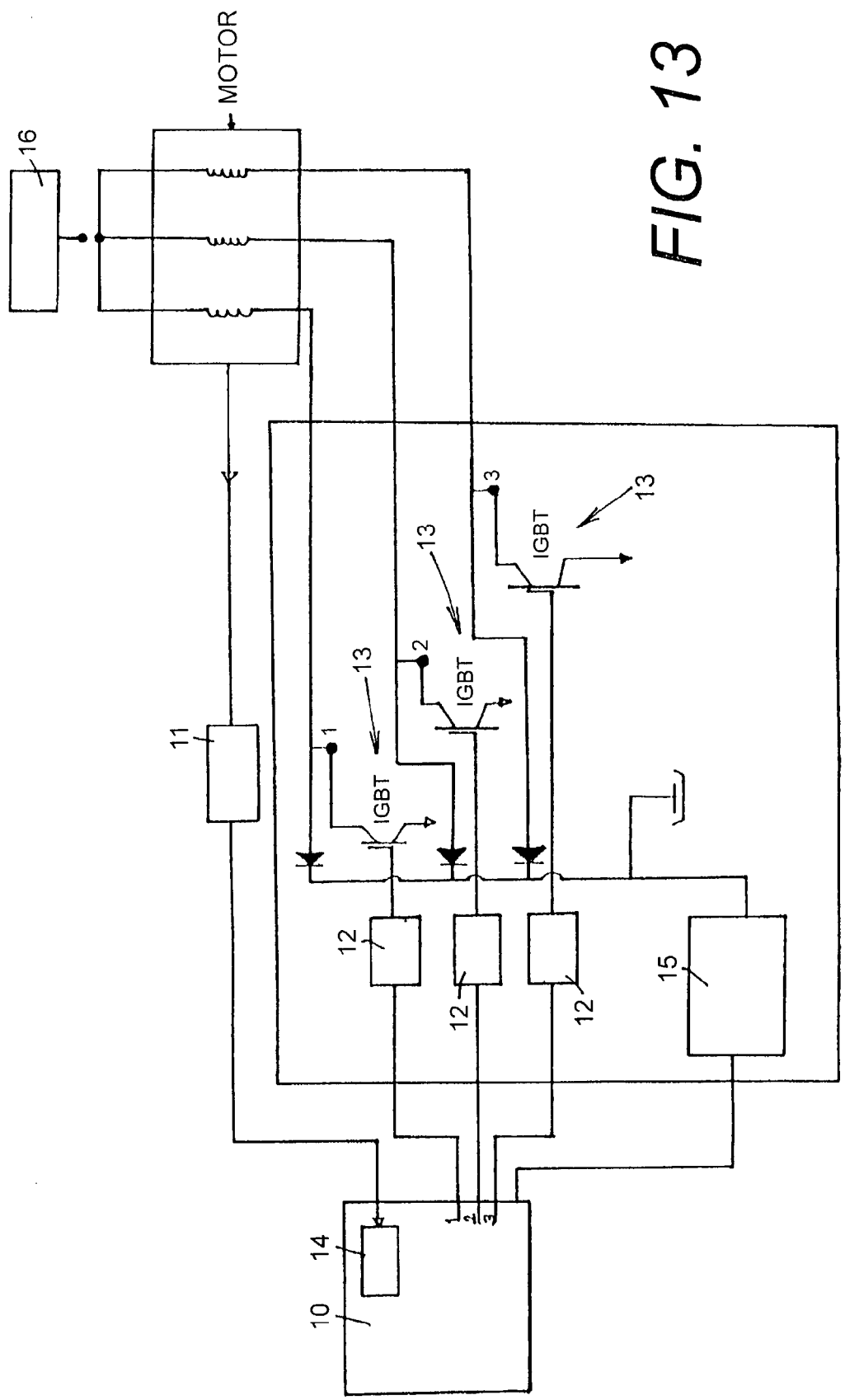
FIG. 13 shows a simplified graph of the controller of the motor discussed herein.
Figure 14:
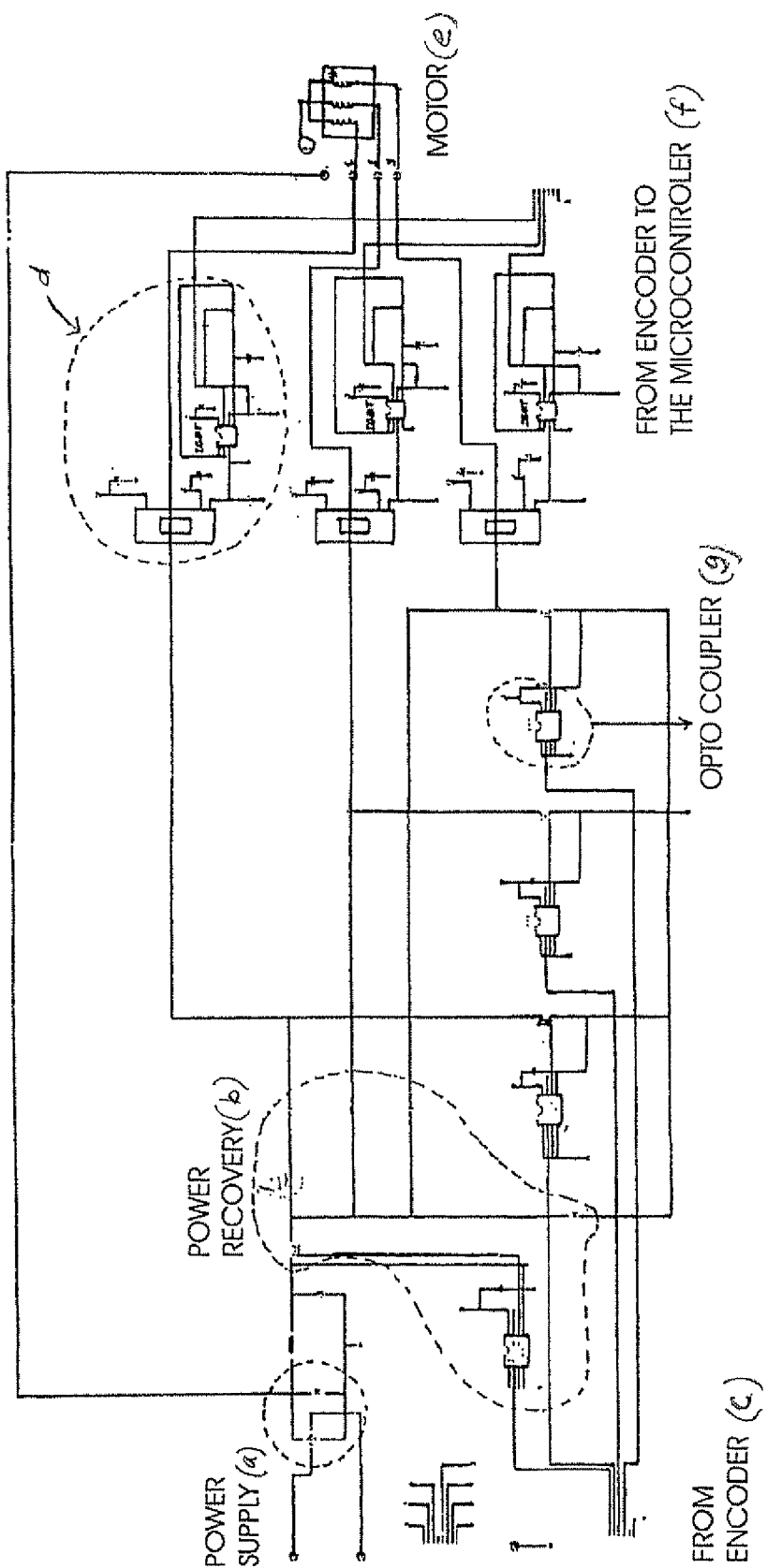
FIG. 14 shows a diagram of a power board associated with this motor's operation, where a) indicates the "power supply", b) indicates the "power recovery", c) indicates the "from encoder", d) indicates the "harmonic filter", e) indicates the "motor", f) indicates "from encoder to the microcontroller" and g) indicates an "optocoupler."

In the electric machine called hybrid reluctance motor with stator or stators 1, with coils 8 and permanent magnets 9 (coils in opposition and permanent magnets in opposition and in parallel with the coils), and steel plate rotor or rotors 2, the commutation of the poles is done in the stator or stators 1 by an electronic commutator 10, as shown in FIG. 13, which has a commutator encoder 11, position sensors for the rotor 12 poles in relation to the stator poles, current sensors 13 and microprocessor, that controls these parameters, as shown in FIG. 13.

The said FIG. 13 also shows: a) a pulse counter block 14; b) an energy recovery circuit block 15; and c) the block that represents the DC variable source 16.

This electronic commuter is applicable to a similar motor but also having magnets in the rotor instead of steel plates. In relation to the motor with coils and magnets in the stator and also in the rotor, commutation is done by the same electronic commuter, in the rotor as well as in the stator.

When the motor has several stators with their respective rotors (with these rotors assembled in a single axis), commutation is done in all the poles of a stator—rotor to all the poles of the next stator—rotor sequentially, as shown in FIG. 4, which shows section D-D, position of the rotor poles entering the stator pole to become aligned.

Once this motion is completed, the current is annulled in the stator/rotor and commuted to the next stator/rotor and subsequent stators/rotors to obtain the uniform pair, thus the motor is made up of stators with coils and permanent magnets and steel plate rotors, or stators with coils and permanent magnets and rotors with magnets only, or stators with coils and permanent magnets and rotors with coils and permanent magnets.

The invention claimed is:

1. Hybrid electric reluctance motor, comprising;
   a stator and rotor;
   an arrangement of coils in the stator and/or rotor, wherein each coil has poles in opposition to poles of an adjacent coil; and
   permanent magnets in the stator and/or rotor each having a polar arrangement in parallel with a polar arrangement of a respective coil, wherein each permanent magnet has poles in opposition to poles of an adjacent permanent magnet.

2. Hybrid electric reluctance motor, according to claim 1, wherein upon energization of the coils, magnetic fluxes of the magnets combine with the magnetic fluxes of the coils in an air gap, to produce a combined flux of increased torque due to the flux contribution of the magnets.

3. Hybrid electric reluctance motor, according to claim 1, wherein upon de-energization of the stator and/or rotor, the magnetic fluxes of the magnets enter a toroid in relation and in proportion to a same flux reduction in the coils as a function of time as a result of the current reduction as a function of time.

4. Hybrid electric reluctance motor, according to claim 1, wherein the magnetic fluxes of the magnets, as a function of the current commutation of the coils and finally by the magnetic flux commutation of the coils, are also commuted from a toroid to a pole and from a pole to the toroid, such that when the current is activated in the coils and when the flux produced in the coils has the same polarity with the flux produced by the magnets which are in the toroid, the fluxes of the magnets leave the toroid and join the fluxes of the coils, the fluxes together being conducted to the pole and air gap; and wherein upon the current being deactivated in the coils, their fluxes practically reduce to zero as a function of time, and at the same time, the fluxes of the magnets enter the toroid, whereby, upon commuting the fluxes of the coils, the fluxes of the magnets are also commuted at low or high frequencies.

5. Hybrid electric reluctance motor, according to claim 1, wherein as a result of the coils being located in opposition the voltage required when the rotor is in motion is reduced.

6. Hybrid electric reluctance motor, according to claim 2, wherein the combined flux increases the torque of the motor, thereby increasing the efficiency of the motor.

7. Hybrid electric reluctance motor, according to claim 1, wherein as a result of the flux contribution of the magnets, the power of the motor is increased without increasing the weight or volume of coils.

* * * * *